United States Patent
Nakao et al.

(10) Patent No.: US 8,006,792 B2
(45) Date of Patent: Aug. 30, 2011

(54) VEHICLE COWL FOR DEFLECTING ROAD DEBRIS

(75) Inventors: Kouta Nakao, Shizuoka (JP); Kuniyuki Takahashi, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 0 days.

(21) Appl. No.: 12/289,429

(22) Filed: Oct. 28, 2008

(65) Prior Publication Data

US 2009/0108630 A1 Apr. 30, 2009

(30) Foreign Application Priority Data

Oct. 31, 2007 (JP) ................................. 2007-284228

(51) Int. Cl.
*B60K 11/08* (2006.01)
(52) U.S. Cl. ........................ 180/68.1; 180/229
(58) Field of Classification Search ............... 180/68.1, 180/68.2, 68.3, 68.4, 68.6, 229
See application file for complete search history.

(56) References Cited

U.S. PATENT DOCUMENTS

| | | | |
|---|---|---|---|
| 4,249,626 A * | 2/1981 | Fields et al. ................. 180/68.1 |
| 4,564,081 A * | 1/1986 | Hamane et al. ............... 180/229 |
| 4,633,965 A * | 1/1987 | Tsurumi et al. ............... 180/229 |
| 4,678,223 A * | 7/1987 | Kishi et al. ................... 296/78.1 |
| 4,685,530 A * | 8/1987 | Hara ............................. 180/219 |
| 4,709,774 A * | 12/1987 | Saito et al. .................... 180/229 |
| 4,830,135 A * | 5/1989 | Yamashita .................... 180/229 |
| 4,887,688 A * | 12/1989 | Horiike et al. ................ 180/229 |
| 4,913,256 A * | 4/1990 | Sakuma ........................ 180/229 |
| 4,964,484 A * | 10/1990 | Buell ............................ 180/219 |
| 5,566,746 A * | 10/1996 | Reise ............................. 165/41 |
| 6,276,482 B1* | 8/2001 | Moriya et al. ................ 180/229 |
| 6,619,415 B1* | 9/2003 | Hasumi et al. ............... 180/68.1 |
| 7,270,207 B2* | 9/2007 | Idei et al. ..................... 180/68.3 |
| 7,370,902 B2* | 5/2008 | Seki et al. .................... 296/78.1 |
| 7,380,624 B2* | 6/2008 | Momosaki .................... 180/68.3 |
| 7,387,180 B2* | 6/2008 | Konno et al. ................. 180/68.3 |
| 7,399,029 B2* | 7/2008 | Takeshita ................. 296/203.01 |
| 7,410,025 B2* | 8/2008 | Sunaguchi et al. ........... 180/229 |
| 7,422,081 B2* | 9/2008 | Dufresne et al. ............. 180/68.1 |
| 7,448,461 B2* | 11/2008 | Misaki et al. ................. 180/68.4 |
| 7,556,115 B2* | 7/2009 | Iwanaga ........................ 180/229 |
| 2007/0017721 A1* | 1/2007 | Dufresne et al. ............. 180/68.6 |
| 2008/0289893 A1* | 11/2008 | Iwanaga ........................ 180/229 |
| 2009/0218152 A1* | 9/2009 | Oohashi et al. .............. 180/68.3 |

FOREIGN PATENT DOCUMENTS

JP 09-076967 3/1997

* cited by examiner

*Primary Examiner* — Jeffrey J Restifo
(74) *Attorney, Agent, or Firm* — Rabin & Berdo, PC

(57) ABSTRACT

A vehicle cowl may comprise a receiving portion formed as a local depression, and one or more openings formed on sides of the receiving portion. The vehicle cowl may be configured to be disposed rearward of a front wheel of a vehicle, the one or more openings to face rearward and the local depression to extend rearward when the vehicle cowl is in place on the vehicle. The receiving portion may be configured to receive and/or deflect an object or substance splashed or thrown up by the front wheel, such as water, mud or road debris, in a position rearward of the front wheel. Moreover, air can flow through the one or more openings on the sides of the receiving portion, to cool heat-generating parts such as the radiator and engine. The vehicle may be a motorcycle.

20 Claims, 6 Drawing Sheets

VEHICLE COWL FOR DEFLECTING ROAD DEBRIS

CROSS-REFERENCE TO RELATED APPLICATION

This application claims priority under 35 U.S.C. §119 from Japanese Patent Application No. 2007-284228, filed Oct. 31, 2007, the entirety of which is incorporated herein by reference.

BACKGROUND OF THE INVENTION

1. Technical Field

Embodiments of the present invention relate generally to a cowl for a vehicle, such as a motorcycle. More particularly, the embodiments relate to a forward-facing cowl structure to be arranged rearward of a front wheel, for deflecting water, mud and road debris while also permitting heat-generating parts of the vehicle to be cooled.

2. Background Art

Vehicle cowls (e.g., exterior covers) for improving aerodynamic characteristics are known. For example, a motorcycle cowl is known wherein the cowl is arranged directly rearward of a front wheel and facing forward. Such a cowl may be used for improving the aerodynamic characteristics of the vehicle and for improving the quality of design. Usually, rearward of a cowl of this kind, there are vehicle parts that need to be cooled, such as an engine, an air exhaust pipe, or a radiator. Thus, cowls as described in the foregoing are known to have openings for cooling these vehicle parts by way of air flow through the openings.

SUMMARY OF THE INVENTION

In embodiments of the present invention, a vehicle cowl may comprise a receiving portion formed as a local depression, and one or more openings formed on sides of the receiving portion. The vehicle cowl may be configured to be disposed rearward of a front wheel of a vehicle, the one or more openings to face rearward and the local depression to extend rearward when the vehicle cowl is in place on the vehicle. The receiving portion may be configured to receive and/or deflect an object or substance splashed or thrown up by the front wheel, such as water, mud or road debris, in a position rearward of the front wheel. The vehicle cowl may be a motorcycle cowl.

Stated in other terms, the vehicle cowl may be a motorcycle cowl comprising a curved panel having an elongated concavity formed in a substantially central portion thereof, and air flow openings formed on sides of the elongated concavity. The motorcycle cowl may be configured to be mounted rearward of a front wheel of the motorcycle so as to at least partly arch over a rear part of the front wheel.

The above-described structures according to embodiments of the present invention can protect against vehicle damage and/or degraded performance. The receiving portion or elongated concavity can direct or deflect water, mud or road debris, such as small pebbles and the like, forward and away the vehicle. This can prevent, for example, mud from adhering to the engine and radiator, degrading cooling performance, and can prevent road debris from striking and possibly damaging vehicle parts. Moreover, air can flow through the one or more openings on the sides of the receiving portion, to cool heat-generating parts such as the radiator and engine.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Figure 1:
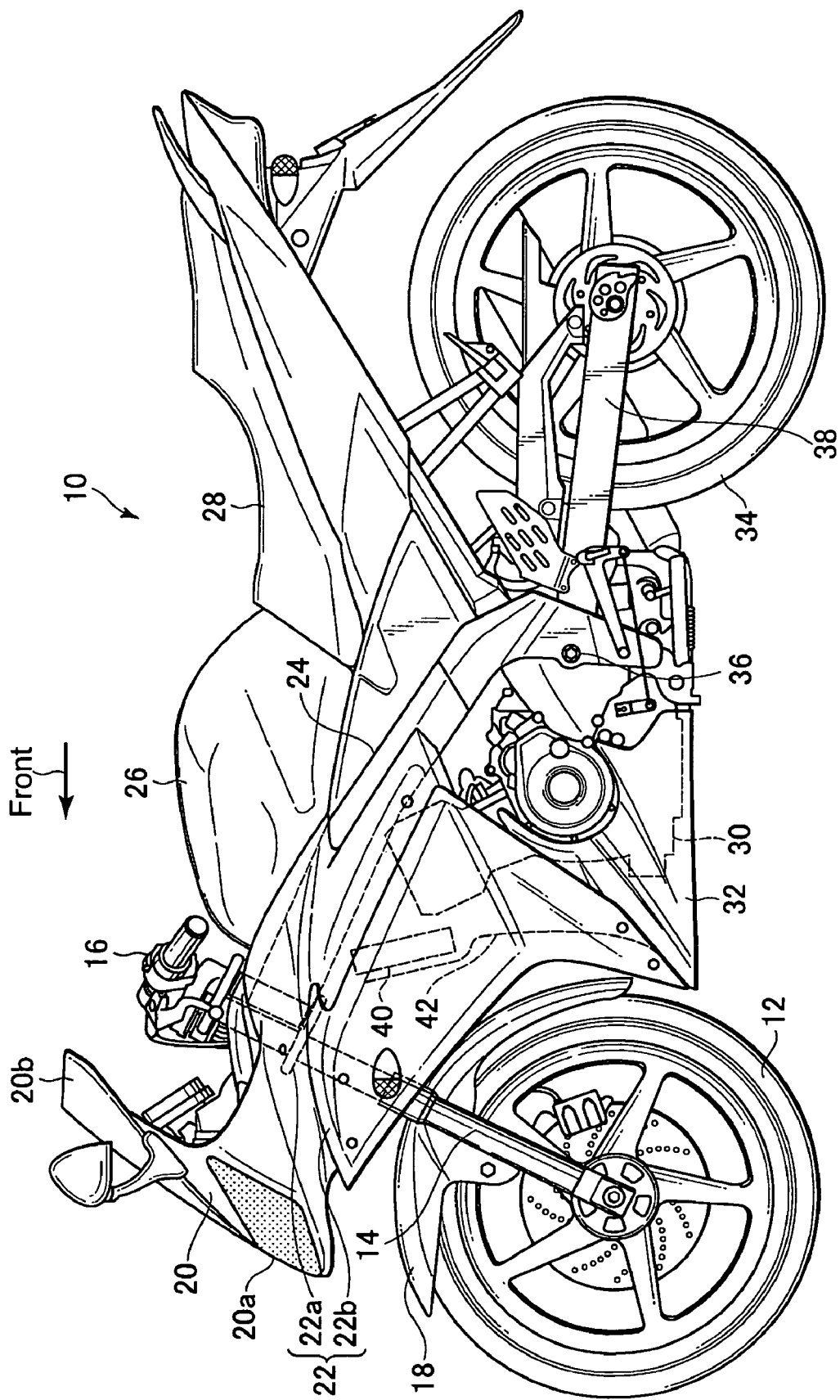
FIG. 1 is a side view of an example of a vehicle, specifically, a motorcycle, according to embodiments of the present invention.

Referring now to FIG. 1, a vehicle 10, for example a motorcycle, according to embodiments of the present invention is shown. The motorcycle 10 may include a front fork 14 for rotatably supporting the axle of a front wheel 12. The motorcycle 10 may further include a handlebar 16 fixed to a top portion thereof. The front wheel 12 can be operated to the left and right by the handlebar 16. The front fork 14 may have a fender 18 fixed thereto, the fender 18 covering the upper portion of the front wheel 12. A front cowl 20 including a head light 20a and a windbreak plate 20b may be disposed forward of the handlebar 16. Moreover, the motorcycle 10 may further have a side cowl 22 fixed thereto, the side cowl 22 covering portions of the vehicle on both sides thereof, and including an inner side cowl 22a and an outer side cowl 22b.

A head pipe (not shown) for supporting the shaft of the handlebar 16 may be arranged downward of the handlebar 16, and a pair of left and right vehicle body frames 24, 24 may extend rearward and downward from the head pipe. A fuel tank 26 may be disposed upward of the vehicle body frames 24, 24, and a rider's seat 28 may be disposed rearward of the fuel tank 26. An engine 30 driven, for example, by gasoline supplied from the fuel tank 26 may be suspended from the vehicle body frames 24, 24, and a lower portion of the engine 30 may be covered by an under cowl 32. The under cowl 32 can protect the engine 30 and can improve the aerodynamic characteristics of the vehicle.

The drive force of the engine 30 may be transmitted to a rear wheel 34 via a chain (not shown). The rear wheel 34 may include an axle supported by a swing arm 38 supported by a pivot 36 so as to be freely swung, the pivot 36 being disposed in rear end portions of the vehicle body frames 24, 24. The foregoing structure can enable the motorcycle 10 to be driven forward while allowing the rear wheel 34 to move up and down responsively to a road surface. A radiator 40 may be disposed forward of the engine 30 so as to face forward of the vehicle. The radiator 40 may cool cooling water of the engine 30 by the "running wind," i.e., a flow of air over the motorcycle due to a forward motion of the motorcycle.

A vehicle cowl according to embodiments of the present invention may be formed as an inner panel 42. The inner panel 42 may be mounted or otherwise disposed forward of the radiator 40 and rearward of the front wheel 12 (see also FIG. 4). The inner panel 42 may be fixed, for example, to the vehicle body frames 24, 24.

Figure 3:
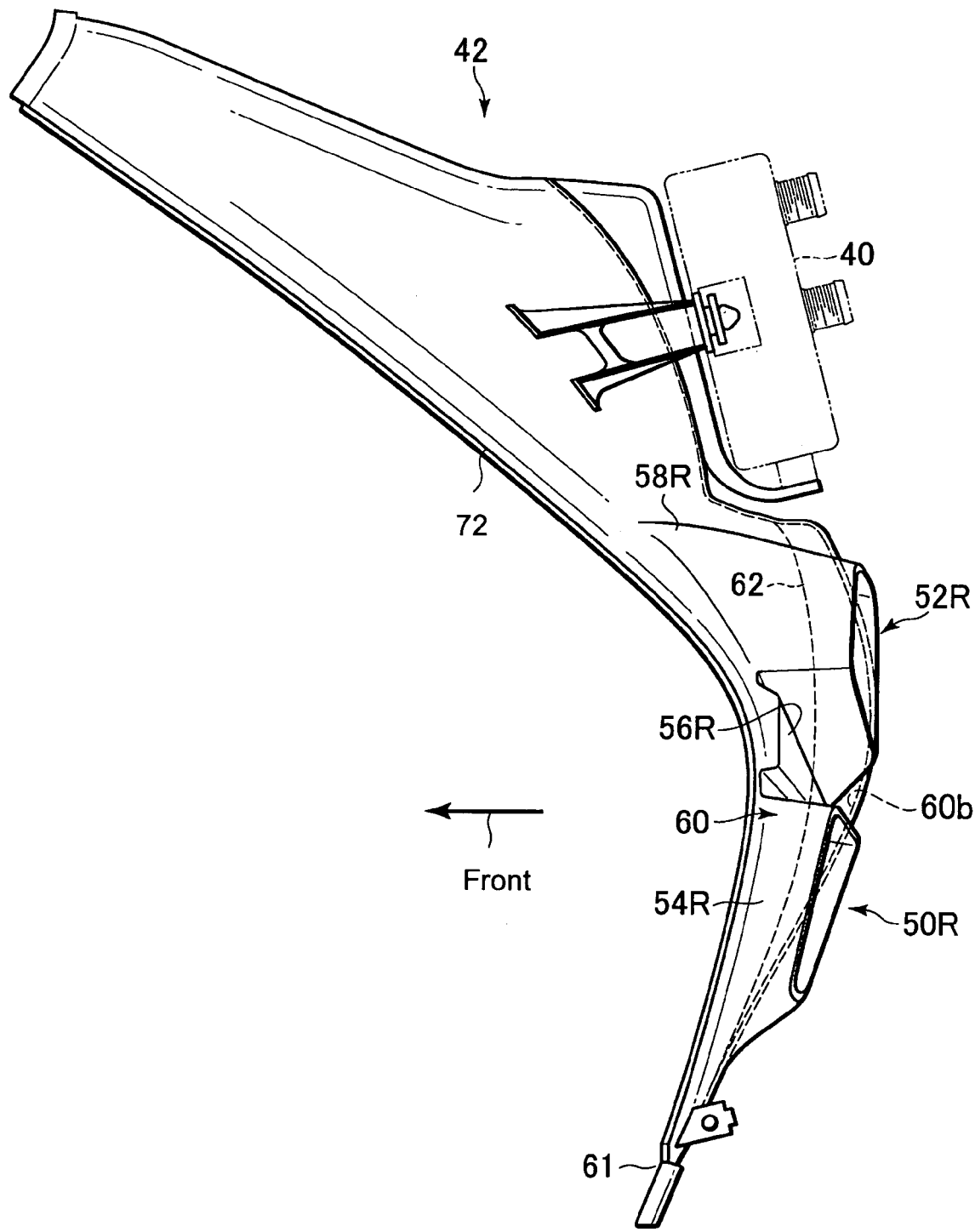
FIG. 3 is a right side view of the inner panel.
Figure 4:
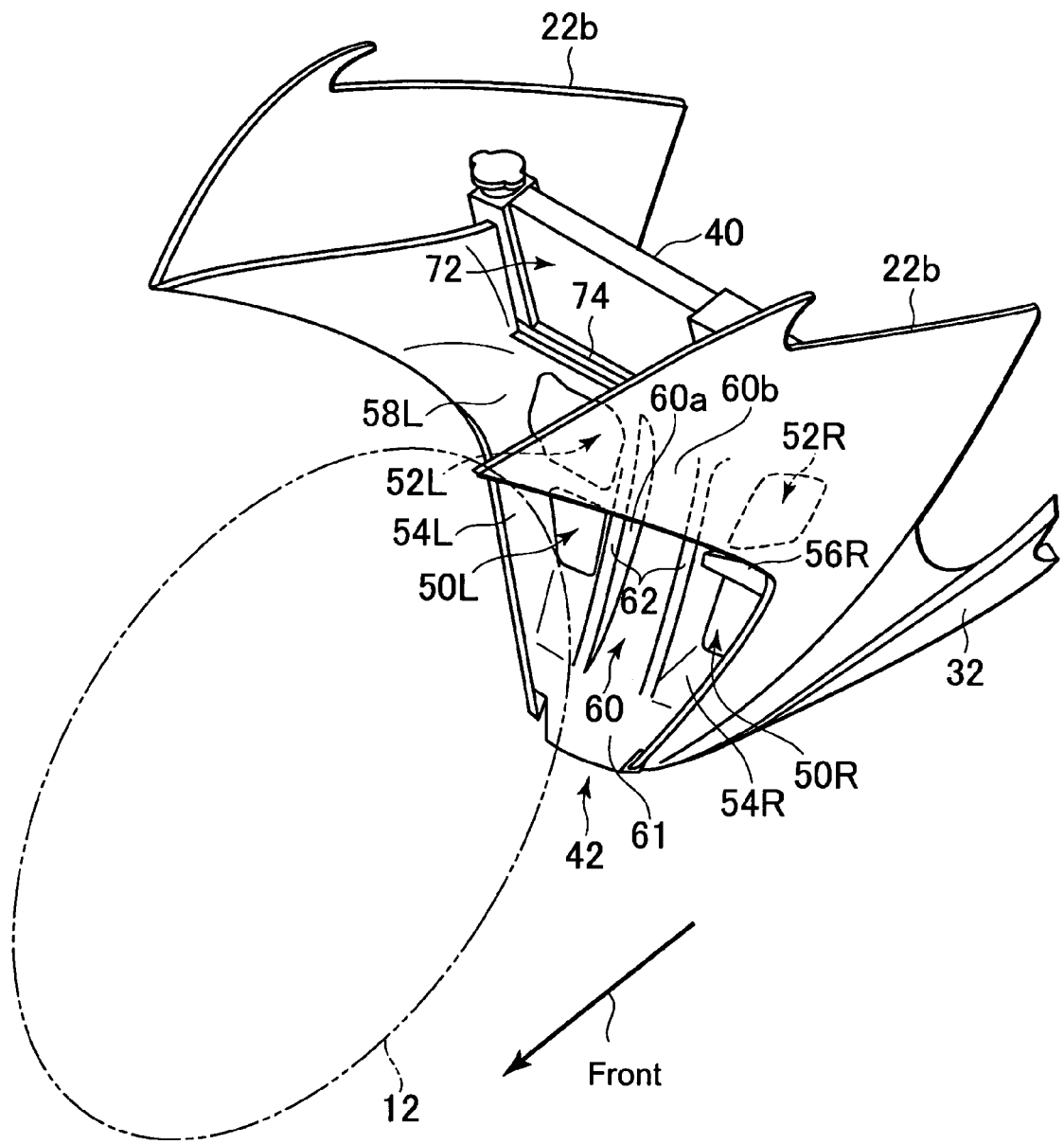
FIG. 4 is an enlarged perspective view of the inner panel.

As seen in FIGS. 3 and 4, for example, the inner panel 42 may be formed in a curved shape that at least partly arches over a rear portion of the front wheel 12 (with the fender 18 intervening). In embodiments, left and right side portions of the inner panel 42 may rise and extend in a forward direction, and be coupled to a front portion of the side cowl 22.

Figure 2:
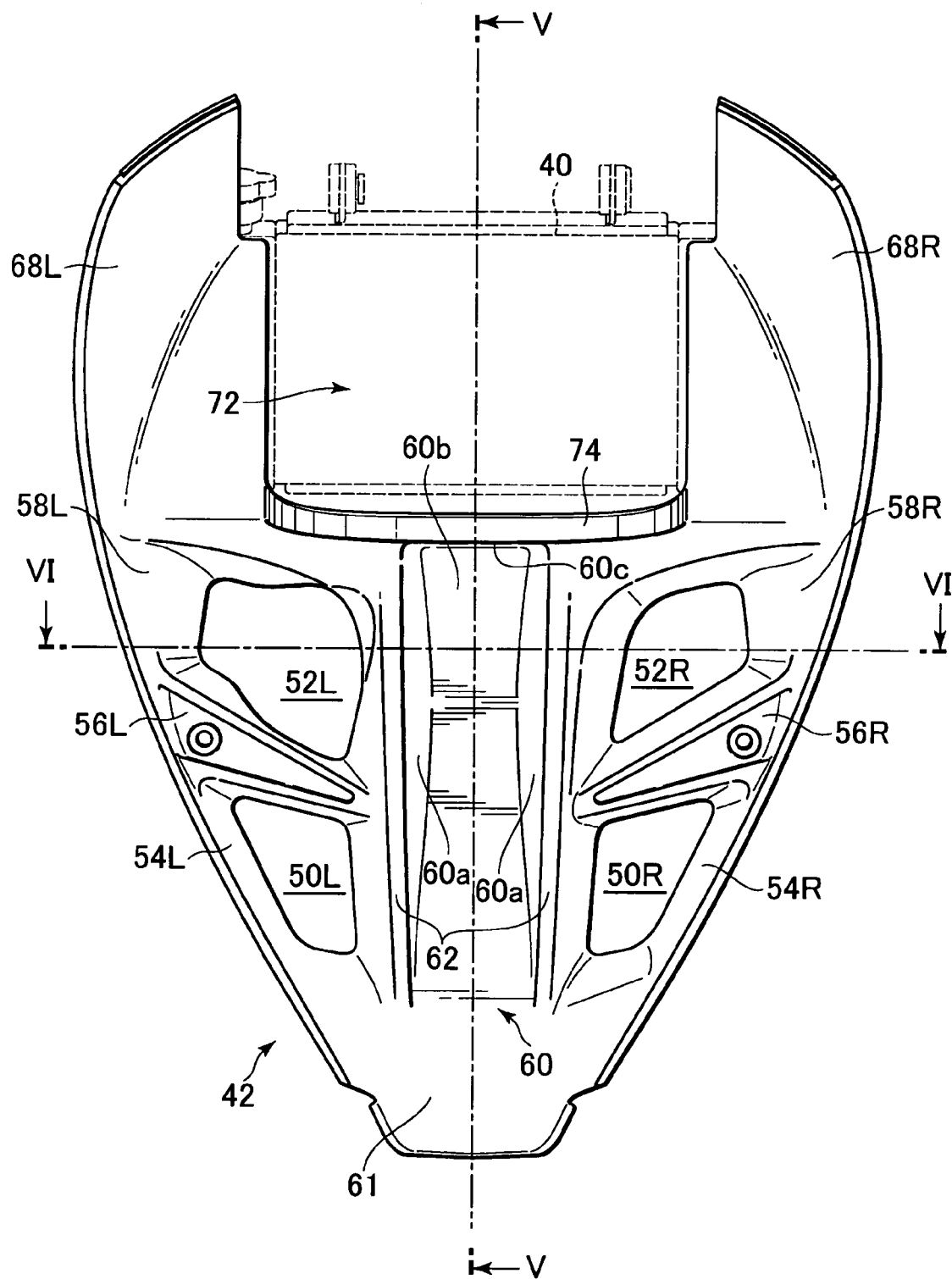
FIG. 2 is a front view of a vehicle cowl configured as an inner panel according to embodiments of the present invention.

Referring now to FIG. 2, in a front view the inner panel 42 may have a substantially oval (e.g., egg-like) shape. For example, in the front view the inner panel 42 may have a substantially bilaterally symmetrical shape whose width becomes narrower toward a lower end. An opening 72 may be formed on an upper end side of the inner panel 42, and face the radiator 40 disposed rearward (see also FIG. 3). Wind introduction walls 68L, 68R may be formed on the left and right sides, respectively, of the opening 72. The wind introduction walls 68L, 68R may rise to a front portion of the outer side cowl 22a from the left and right edges of the opening 72. Running wind can be smoothly introduced into the opening 72 by the wind introduction walls 68L, 68R.

Figure 5:
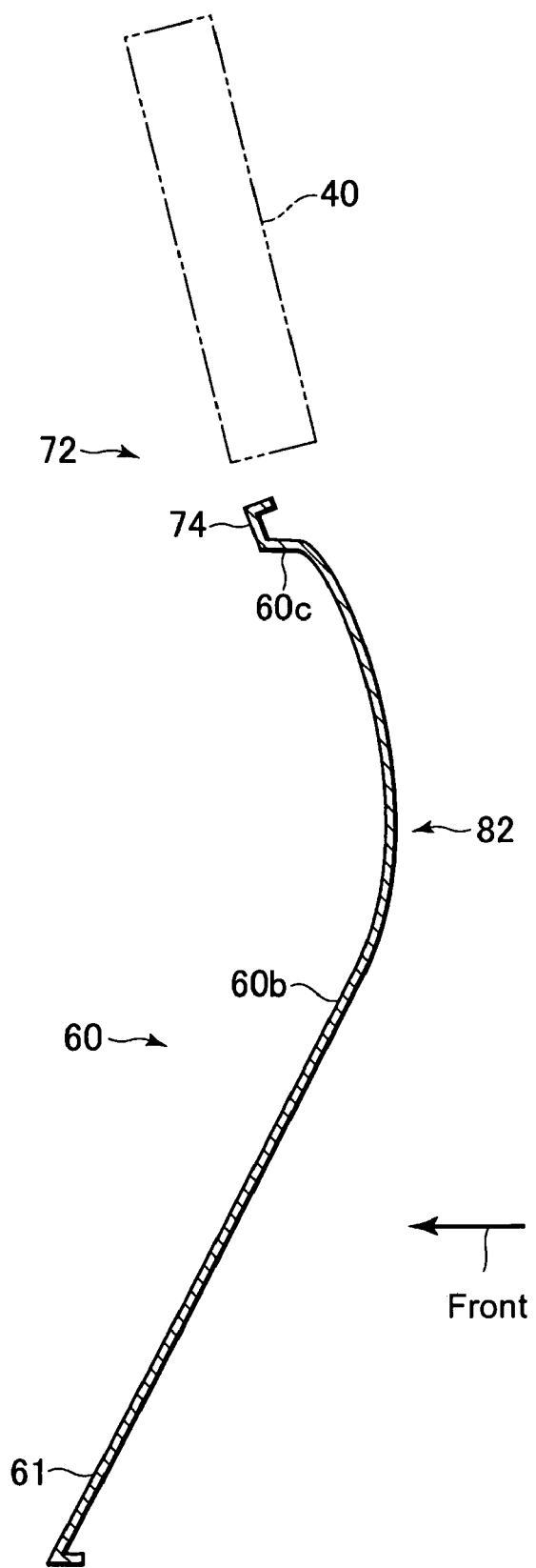
FIG. 5 is a cross-sectional view along line V-V of FIG. 2.

The inner panel 42 may include a flat portion 61 formed in a lower portion thereof, the flat portion 61 being slanted rearward (see FIGS. 3 and 5). The inner panel 42 may further include a receiving portion 60, for receiving and/or deflecting, e.g., water, mud and road debris thrown up by the front wheel 12. The receiving portion 60 may be formed upward of the flat portion 61. The receiving portion 60 may extend upward to a lower end portion of the opening 72 along an axis substantially in the center of the inner panel 42 (coinciding, for example, with the line V).

The inner panel 42 may further have openings 50R and 52R formed on the right side of the receiving portion 60 and substantially aligned in an up-and-down direction, and openings 50L and 52L formed on the left side of the receiving portion 60 and substantially aligned in an up-and-down direction. The openings 50R, 50L, 52R, and 52L may act as wind introduction openings, allowing the running wind impinging onto a rear portion of the inner panel 42 to pass through, thereby cooling, for example, heat-generating parts such as the engine 30 and an air exhaust pipe (not shown) connected to the engine 30, disposed rearward of the inner panel 42.

The inner panel 42 may further include a reinforcing rib 56R formed between the opening 52R and the opening 50R, and extending substantially in a vehicle width direction (e.g. a side-to-side direction substantially transverse to a vehicle front-to-rear direction). Similarly, the inner panel 42 may include a reinforcing rib 56L formed between the opening 52L and the opening 50L and extending substantially in a vehicle width direction.

Wind introduction or air-channeling surfaces 54R, 54L, 58R and 58L may be formed around or adjacent to the openings 50R, 50L, 52R and 52L, respectively. In embodiments, each of the wind introduction surfaces 54R, 54L, 58R, and 58L may be formed in the shape of a duct tapered in a forward to rearward direction with respect to the vehicle 10. The wind introduction surfaces 54R, 54L, 58R, and 58L can assist in the introduction of the running wind to the heat generating parts disposed rearward of the vehicle.

Referring now to FIG. 3, the receiving portion 60 may be formed as a concavity or depression locally, that is, with respect to the inner panel 42 as seen in a side view as in FIG. 3. The concavity or depression of the receiving portion 60 may extend rearward with respect to the vehicle 10. The receiving portion 60 may have in an elongated shape that extends in an up-and-down direction along the axis, mentioned previously, substantially in the center of the inner panel 42 and coinciding, for example, with the line V. The receiving portion 60 may have a width approximately equal to a width of the front wheel 12.

Figure 6:
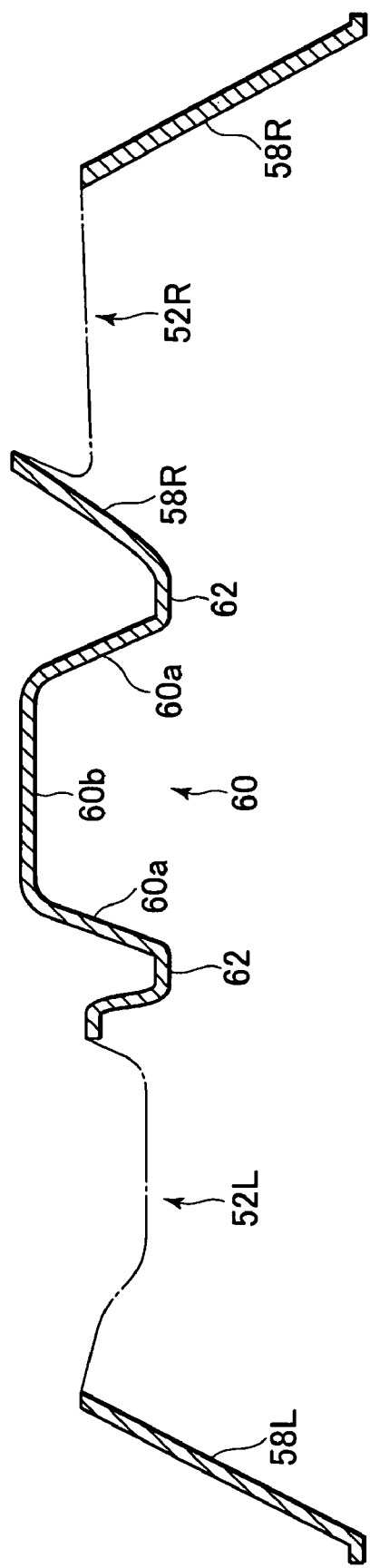
FIG. 6 is a cross-sectional view along line VI-VI of FIG. 2.

Referring also to FIGS. 2, 4 and 6, the receiving portion 60 may further include rising surfaces 60a rising from a bottom portion 60b toward a perimeter of the receiving portion 60 and edges of the openings 50R, 50L, 52R, and 52L. The configuration of the receiving portion 60 can guide water, mud and road debris thrown up by the front wheel 12 forward, back toward the front wheel 12 and away from the vehicle and the openings 72, 50R, 50L, 52R, and 52L. In this way, the water, mud and road debris can be prevented from striking engine parts and thus damaging or degrading their performance. At the same time, the running wind can pass through the openings 72, 50R, 50L, 52R, and 52L to cool rearward engine parts.

More specifically, referring now to FIG. 5, the bottom portion 60b may include a most rearward or middle portion 82 of the receiving portion 60. Above and below the middle portion 82, that is, in upper and lower portions of the receiving portion 60, the receiving portion 60 may bend or incline with respect to the middle portion 82. For example, the upper and lower portions may bend or incline in a forward direction with respect to the vehicle 10, when the inner panel 42 is in place on the vehicle 10. A rising surface 60c may be formed on an upper end of the bottom surface 60b. With this configuration, water, mud and road debris thrown up by the front wheel 12 can strike the bottom surface 60b and be guided along the bottom surface 60b. This can cause the speed of the water, mud and road debris to gradually decrease, and the water, mud and road debris to be dropped forward of the bottom surface 60b. Moreover, the rising surface 60c formed on the upper end of the bottom surface 60b can guide water, mud and road debris moving at higher speeds forward and away.

As shown in FIG. 5, the rising surface 60c may be formed on an edge of the opening 72, thereby preventing the water, mud and road debris from entering the opening 72. The inner panel 42 may further include a reinforcing rib 74 formed between the receiving portion 60 and the opening 72, the reinforcing rib 74 extending in the vehicle width direction (see FIG. 2). The reinforcing rib 74 can strengthen the inner panel 42 and separate the receiving portion 60 from the opening 72, thereby making it more difficult for water, mud and road debris to enter the opening 72.

Referring now to FIG. 6, a shape of the rising surfaces 60a, 60a formed on the left and right ends of the bottom surface 60b of the receiving portion 60 is shown in cross-section. As seen in FIG. 6, the rising surfaces 60a, 60a may extend in a forward direction with respect to the vehicle 10 when the inner panel 42 is in place on the vehicle 10. This configuration can make it difficult for water, mud and road debris to enter the openings 50R, 50L, 52R, and 52L arranged on the left and right sides of the receiving portion 60.

Moreover, the inner panel 42 may further include a reinforcing rib 62 formed between the receiving portion 60 and the openings 50R, 52R, and a reinforcing rib 62 formed between the receiving portion 60 and the openings 50L, 52L

(see also FIG. 2). The reinforcing ribs 62 can strengthen the inner panel 42, and may separate the receiving portion 60 from the openings 50R, 52R, 50L, 52L. Thus, the reinforcing ribs 62 are another structure for making it more difficult for water, mud and road debris to enter the openings 50R, 52R, 50L, 52L.

To review elements of the above, an inner panel 42 according to embodiments of the present invention may include a receiving portion 60 formed as concavity or local depression, with a bottom surface 60b and rising surfaces 60a and 60c. These structures can guide water, mud and road debris thrown up by the front wheel 12 forward and away from the motorcycle 10, at the same time preventing the water, mud and road debris from entering the openings 50R, 50L, 52R, 52L, and 72 arranged around the receiving portion 60 and potentially degrading a vehicle performance or damaging the vehicle. Meanwhile, running wind flowing through the openings 50R, 50L, 52R, 52L, and 72 can cool the vehicle.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

The invention claimed is:

1. A vehicle cowl, comprising:
    an inner panel having a central opening formed in an upper end side thereof, the central opening extending downward from an upper edge of the inner panel;
    wind introduction walls formed on sides of the central opening;
    a receiving portion narrower than the central opening, located below the central opening, the receiving portion formed as a local depression in a central surface of the inner panel, extending in an up-and-down direction in a central portion of the inner panel, and including a bottom surface and a pair of rising surfaces formed on left and right ends of the bottom surface; and
    one or more openings formed on sides of the receiving portion;
    the vehicle cowl to be disposed rearward of a front wheel of a vehicle, the one or more openings to face rearward, the receiving portion to be located below a radiator disposed on the vehicle, the bottom surface to face the front wheel and the local depression to extend rearward when the vehicle cowl is in place on the vehicle.

2. The vehicle cowl of claim 1, wherein the receiving portion extends along an axis in a center of the vehicle cowl.

3. The vehicle cowl of claim 2, wherein the central opening faces the radiator.

4. The vehicle cowl of claim 3, wherein the pair of rising surfaces rise toward a perimeter of the receiving portion.

5. The vehicle cowl of claim 2, wherein the one or more openings include a wind introduction opening on at least one side of left and right sides of the receiving portion, the wind introduction opening to introduce a running wind into a rearward position.

6. The vehicle cowl of claim 5, wherein at least one of the pair of rising surfaces rises toward an edge of the wind introduction opening.

7. The vehicle cowl of claim 5, further including a wind introduction surface formed around the wind introduction opening.

8. The vehicle cowl of claim 1, wherein the bottom surface of the receiving portion includes a middle portion, and upper and lower portions of the bottom surface are inclined with respect to the middle portion.

9. The vehicle cowl of claim 1, wherein at least one of the pair of rising surfaces rises toward an edge of an opening of the one or more openings.

10. A vehicle including a vehicle cowl as recited in claim 1.

11. The vehicle of claim 10, wherein the vehicle is a motorcycle.

12. A motorcycle cowl, comprising:
    a curved panel having
        a central opening formed in an upper end side thereof, the central opening extending downward from an upper edge of the curved panel,
        wind introduction walls formed on sides of the central opening,
        an elongated concavity, narrower than the central opening and located below the central opening, formed in a surface of a central portion of the curved panel, the elongated concavity including a bottom surface and a pair of rising surfaces formed on left and right ends of the bottom surface; and
    air flow openings formed on sides of the elongated concavity;
    wherein the cowl is configured to be mounted rearward of a front wheel of a motorcycle, the elongated concavity to be located below a radiator disposed on the motorcycle, and the bottom surface to face the front wheel.

13. The motorcycle cowl of claim 12, wherein the cowl is configured so as to at least partly arch over a rear part of the front wheel.

14. The motorcycle cowl of claim 12, wherein the cowl includes reinforcing ribs between the air flow openings.

15. The motorcycle cowl of claim 12, wherein the cowl includes reinforcing ribs between the elongated concavity and the air flow openings.

16. The motorcycle cowl of claim 12, further comprising air-channeling surfaces formed adjacent the air flow openings.

17. The motorcycle cowl of claim 12, wherein the pair of rising surfaces rises toward a perimeter of the concavity.

18. A vehicle cowl, comprising:
    an upper portion having a central opening formed in an upper end side thereof, the central opening extending downward from an upper edge of the upper portion,
    wind introduction walls formed on sides of the central opening,
    deflection means for deflecting any of water, mud or road debris from the vehicle, the deflection means including a curved, elongated concavity, narrower than the central opening and located below the central opening, formed in a central surface of the vehicle cowl, for being arranged rearward of a front wheel of a vehicle and below a radiator disposed on the vehicle, the elongated concavity including a bottom surface to face the front wheel and a pair of rising surfaces formed on left and right ends of the bottom surface; and
    cooling means for cooling the vehicle by way of air flow.

19. The vehicle cowl of claim 18, wherein the cooling means includes openings formed in the vehicle cowl.

20. The vehicle cowl of claim 19, wherein cooling means further includes air channeling surfaces for channeling air to the openings.

* * * * *